(12) United States Patent
Park et al.

(10) Patent No.: US 9,122,565 B2
(45) Date of Patent: Sep. 1, 2015

(54) MEMORY CONTROLLER AND MEMORY CONTROL METHOD

(71) Applicant: Samsung Electronics Co., Ltd., Suwon-si (KR)

(72) Inventors: Jae-Un Park, Seoul (KR); Ki-Seok Kwon, Seoul (KR); Suk-Jin Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 240 days.

(21) Appl. No.: 13/709,542

(22) Filed: Dec. 10, 2012

(65) Prior Publication Data

US 2013/0151794 A1   Jun. 13, 2013

(30) Foreign Application Priority Data

Dec. 12, 2011   (KR) ........................ 10-2011-0133196

(51) Int. Cl.
*G06F 12/10* (2006.01)
*G06F 12/00* (2006.01)
*G06F 13/18* (2006.01)
*G06F 13/16* (2006.01)

(52) U.S. Cl.
CPC ............ *G06F 12/00* (2013.01); *G06F 13/1673* (2013.01); *G06F 13/1689* (2013.01); *G06F 13/18* (2013.01)

(58) Field of Classification Search
CPC ..... G06F 13/18; G06F 12/00; G06F 13/1673; G06F 13/1689
USPC .......................................... 711/158
See application file for complete search history.

(56) References Cited

U.S. PATENT DOCUMENTS

| | | | | |
|---|---|---|---|---|
| 5,471,631 | A * | 11/1995 | Beardsley et al. | 713/502 |
| 5,809,548 | A * | 9/1998 | Chang et al. | 711/166 |
| 6,622,225 | B1 | 9/2003 | Kessler et al. | |
| 7,231,478 | B2 | 6/2007 | Leijten | |
| 2004/0064662 | A1 | 4/2004 | Syed et al. | |
| 2006/0161742 | A1 * | 7/2006 | Sugimoto et al. | 711/154 |
| 2008/0140980 | A1 | 6/2008 | Mei et al. | |

FOREIGN PATENT DOCUMENTS

KR   10-0990902   11/2010

* cited by examiner

*Primary Examiner* — Jae Yu
(74) *Attorney, Agent, or Firm* — NSIP Law (57) ABSTRACT

Provided is a memory controller that manages memory access requests between the processor and the memory. In response to the memory controller receiving two or more memory access requests for the same area of memory, the memory controller is configured to stall the memory controller and sequentially process the memory access requests.

15 Claims, 10 Drawing Sheets

MEMORY CONTROLLER AND MEMORY CONTROL METHOD

CROSS-REFERENCE TO RELATED APPLICATION(S)

This application claims the benefit under 35 USC §119(a) of Korean Patent Application No. 10-2011-0133196, filed on Dec. 12, 2011, in the Korean Intellectual Property Office, the entire disclosure of which is incorporated herein by reference for all purposes.

BACKGROUND

1. Field

The following description relates to a memory control technique for controlling memory access of a plurality of load/store units.

2. Description of the Related Art

As the development of information and communication technologies have increased, so have various computer systems, such as a smart phone, a digital camera, a digital TV, and the like. Recently developed computer systems are typically provided with a high-speed processor. The high-speed processor is accompanied with a high-speed memory controller to support high-speed performance.

Generally, a memory controller receives memory access requests, for example, data read requests, data write requests, and the like. The requests may be received from various processing units, for example, a Central Processing Unit (CPU), a graphics accelerator, and the like in a computer system. The memory controller processes the memory access requests.

For example, the memory controller may receive a data load request from a CPU, read the requested data from a memory in response to the memory load request, and return the read data to the CPU. At this time, the CPU may generate a predetermined stall in order to wait to receive the requested data in consideration of predetermined load latency. During a stall, the operational state of CPU is stopped. The frequent generation of stalls results in performance deterioration of system.

SUMMARY

In an aspect, there is provided a memory controller including a global time controller configured to control a global time based on whether a stall is generated, a receiver configured to receive at least one memory access request, and to set a time tag of the memory access request using the global time, a memory access unit configured to access a memory based on the memory access request to store or load data to or from the memory, and an output unit configured to return the data at a time that is based on a comparison between the time tag and the global time.

The memory controller may further comprise a memory access preparing unit comprising a shared queue for storing the memory access request.

The stall may be generated if at least two memory access requests requesting access to the same memory area are present and the load latency is equal to the number of pipeline stages. The rest explanation of this patent will be based on the condition that the load latency is equal to the number of pipeline stages.

The global time controller may change the global time each operation cycle, except in an operation cycle in which a stall is generated.

The shared queue may be provided for each load/store unit that generates the memory access request.

The memory area may be defined based on an interleaved bank.

The global time controller may define the global time using the number of entries of reorder buffers (ROBs) of a processing core including a load/store unit that generates the memory access request.

The number of the entries of the ROBs may be an arbitrary integer k which is equal to the number of pipeline stages in the memory controller and the global time controller may change the global time using integers between 0 and (k−1).

The number of the entries of the ROBs may be an arbitrary integer k which is equal to the number of pipeline stages in the memory controller, and the receiver may set the time tag to a value resulting from adding (k−1) to a global time at which the memory access request is received.

The output unit may comprise at least one reorder buffer (ROB) for storing loaded data and which is provided for each load/store unit that generates the memory access request.

In response to data being loaded, the output unit may store the loaded data in the ROB according to the time tag of the memory access request, and in response to the time tag being equal to the global time, the output unit may return the data stored in the ROB to a load/store unit. If the time tag of the memory access request is equivalent to the global time, the loaded data is directly returned to a load/store unit.

In an aspect, there is provided a memory control method including in response to at least one memory access request being received, setting a time tag of the memory access request using a predetermined global time that has a value that changes each operation cycle except for an operation cycle in which a stall is generated, determining whether to generate a stall, based on the number of memory access requests requesting access to the same memory area, and adjusting the global time based on whether the stall is generated, accessing a memory according to the memory access request to store or load data to or from the memory, and in response to the data being loaded, returning the data at a time based on a comparison between the time tag and the global time.

The global time may be defined based on the number of entries of reorder buffers (ROBs) of a processing core including a load/store unit that generates the memory access request.

The determining of whether to generate the stall may comprise generating a stall in response to the number of memory access requests requesting access to the same memory area being two or more.

The returning of the data may comprise storing the loaded data in at least one ROB provided for each load/store unit that generates the memory access request, and in response to the time tag being equal to the global time, returning the data stored in the ROB to a load/store unit.

In an aspect, there is provided a terminal including a processor configured to process data, a memory for storing data to be processed by the processor and for storing data processed by the processor, and a memory controller configured to manage memory access requests between the processor and the memory, and, in response to the memory controller receiving two or more memory access requests for the same area of memory, the memory controller is configured to stall the memory controller and sequentially process the memory access requests.

The memory controller may maintain a global clock time that changes based on an operation cycle.

In response to the memory controller receiving two or more memory access requests to the same area of memory during an operation cycle, the memory controller may pause the global clock time even though the operation cycle increases.

The memory controller may assign a time tag to a memory access request, and provide the result of the memory access request to the processor at a time based on a difference between a time tag and the global clock time.

The memory controller may provide the result of the memory access request to the processor when the time tag of the memory access request is equal to the global clock time.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
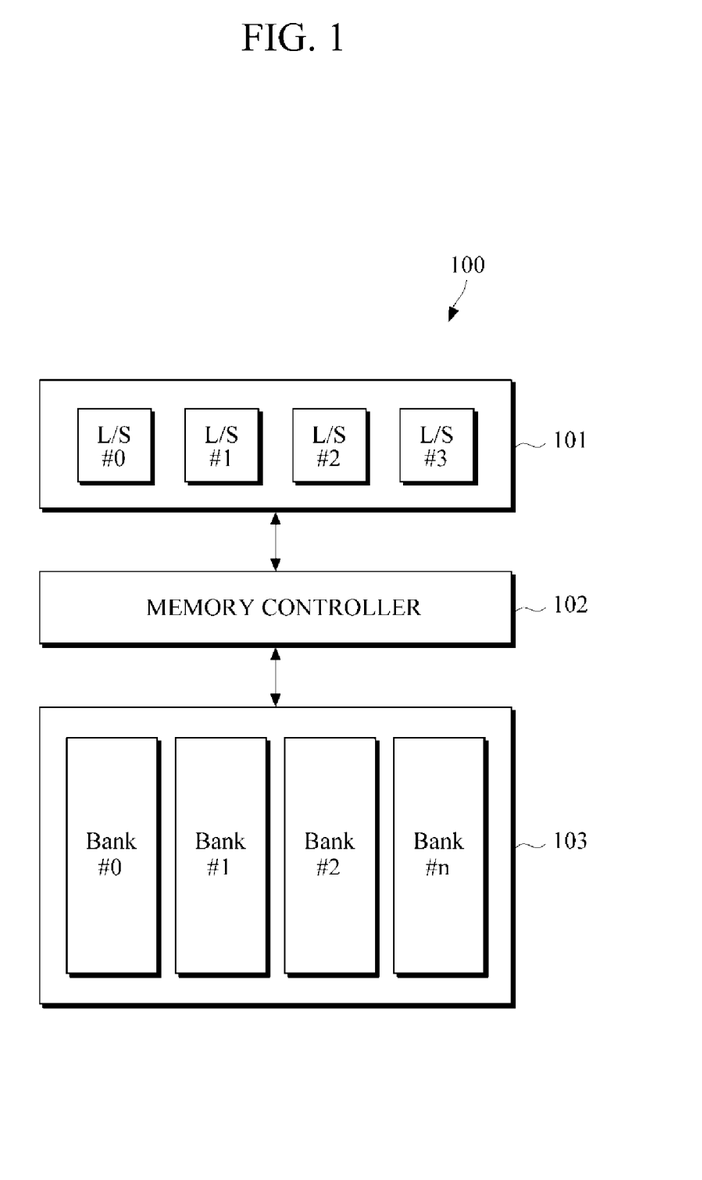
FIG. 1 is a diagram illustrating an example of a system including a memory controller.

FIG. 1 illustrates an example of a system 100 including a memory controller 102.

Referring to FIG. 1, the system 100 includes a processor 101, the memory controller 102, and a memory 103. For example, the system 100 may be included in a terminal such as a smart phone, a digital TV, a MP3 player, a personal computer, a tablet, an appliance, and the like.

The processor 101 may execute various applications and arithmetic/logic operations for each application. Various data, for example, instructions, operands, and the like, to be processed by the processor 101 may be stored in the memory 103. For example, data stored in the memory 103 may be loaded onto the processor 101. Also, the results of processing by the processor 101 may be stored in the memory 103. The processor 101 and the memory 103 may be connected to each other by the memory controller 102. In this example, the memory controller 102 manages data that is transmitted/received between the processor 101 and the memory 103. For example, the memory controller 102 may transfer data of the processor 101 to the memory 103 or data of the memory 103 to the processor 101 based on a memory access request from the processor 101.

According to another aspect, the processor 101 may include a plurality of load/store (L/S) units such as L/S#0 through L/S#3. Each of the L/S units L/S#0 through L/S#3 may generate a memory access request. In this example, the memory access request may include an address of a memory area that the processor 101 is to access.

According to another aspect, the processor 101 may include a plurality of processors or processing cores which are subject to data management by the memory controller 102. In an example in which a plurality of processors are provided, the processors may include a main CPU, a processing core of a graphics device, various master devices, and the like.

According to another aspect, the memory 103 may include a plurality of memory banks Bank#0 through Bank#n that are configured in an interleaved fashion.

Figure 2:
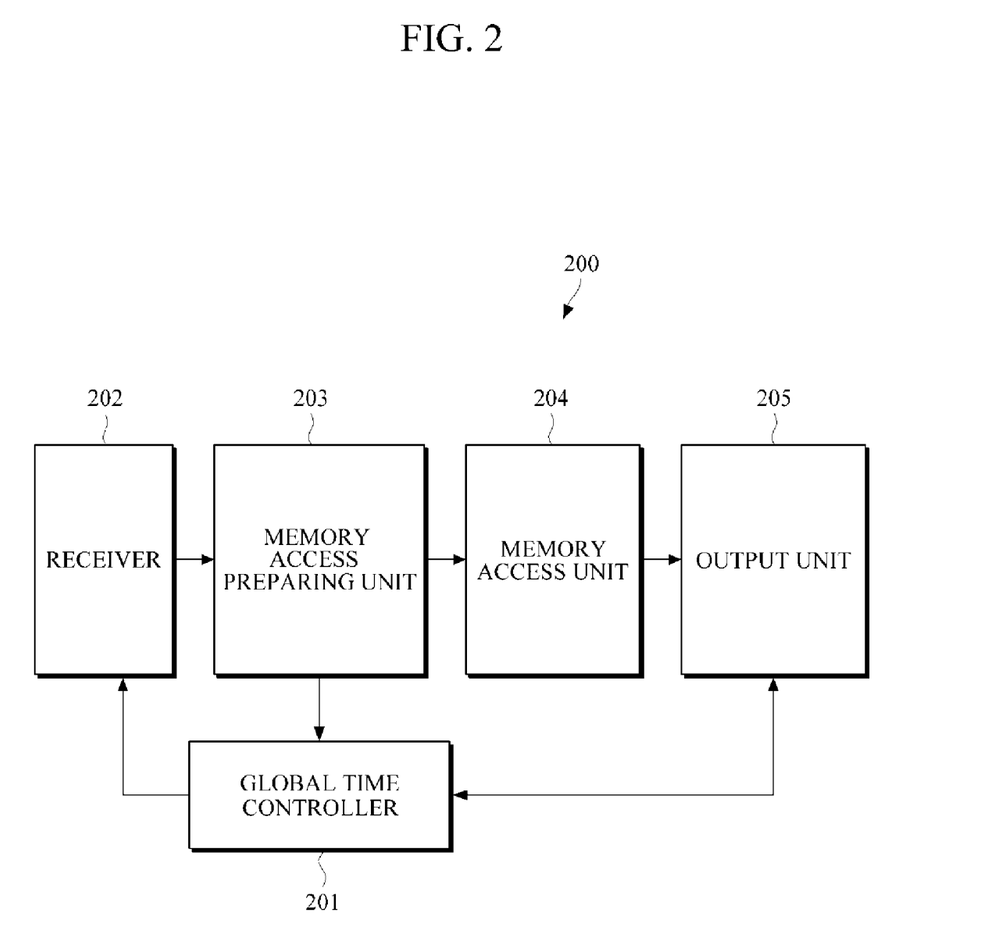
FIG. 2 is a diagram illustrating an example of a memory controller.

FIG. 2 illustrates an example of a memory controller 200.

Referring to FIG. 2, the memory controller 200 includes a global time controller 201, a receiver 202, a memory access preparing unit 203, a memory access unit 204, and an output unit 205.

The global time controller 201 manages a global time. The global time may be a kind of global variable that is defined according to the current example. For example, the global time may be a global variable that has a value that changes depending on an operation cycle. For example, the global time may correspond to a clock cycle change of a computer. Although the global time may increase as the operation cycle increases, in some examples, the global time may be maintained even though the operation cycle increases. The global time controller 201 defines such a global time and controls changes (an increase or stop) of the global time.

According to an aspect, the global time may be defined based on the number of pipeline stages and the number of entries of reorder buffers (ROBs) that are decided based on the number of pipeline stages. For example, the number of entries of ROBs may be decided according to the maximum number of memory requests that can exist in the pipeline stages, that is, according to the number of pipeline stages. For the simple structure, the number of entries of ROBs is equal to the number of pipeline stages. For example, if the number of entries of ROBs is k, the global time may vary repeatedly in a pattern of 0, 1, 2, . . . , k−1, 0, 1, 2, . . . , k−1. Accordingly, the global time controller 201 may be implemented as a circulation counter.

The global time controller 201 may control the global time according to whether a stall is generated. For example, the global time controller 201 may change the global time each operation cycle. However, if a stall is generated, the global time controller 201 may not change the global time at that respective operation cycle, but may instead maintain the global time. The stall refers to operation-stopped states of a processor (for example, the processor 101 of FIG. 1) connected to the memory controller 200 and of the previous pipeline stages. In other words, the global time controller 201 determines whether to change the global time each operation cycle. For example, the global time controller 201 may change the global time when detecting no stall state, and may not change the global time when detecting a stall state.

For example, the number of pipeline stages and the number of entries of ROBs according to the number of pipeline stages may be 4 (that is, k=4). In this example, the global time t changes recursively in the pattern of 0, 1, 2, 3, 0, 1, 2, 3, . . . , and a relationship between a generation of a stall and a change in global time over operation cycle may be represented as a table 1 below.

TABLE 1

| | Operation Cycle | | | | | | | | |
|---|---|---|---|---|---|---|---|---|---|
| | 0 | 1 | 2 | 3 | 4 | 5 | 6 | 7 | 8 |
| Whether Stall Is Detected | X | X | X | 0 | X | X | 0 | X | X |
| Global Time | 0 | 1 | 2 | 2 | 3 | 0 | 0 | 1 | 2 |

Referring to Table 1, the global time increases to 0, 1, 2 in the operation cycles 0, 1, 2. However, a stall is generated in the operation cycle 3. Accordingly, the global time 2 is paused, that is, the global time is maintained as the global time in the previous operation cycle. Likewise, in the operation cycle 6 in which a stall is detected, the global time does not change.

The receiver 202 receives memory access requests. For example, the receiver 202 may receive a plurality of memory access requests for storing or loading of data from a plurality of L/S units. The receiver 202 may create a memory address and set a predetermined time tag in response to each memory access request. For example, the predetermined time tag may be a local constant that is allocated to each memory access request or to each data loaded in response to the memory access request. The predetermined time tag may be an identifier (ID) of a ROB of the output unit 205, an example of which is described later.

In some examples, the receiver 202 may set the time tag using a global time that is managed by the global time controller 201. For example, if the number of entries of ROBs in the output unit 205 is k, the receiver 202 may set a time tag resulting from adding (k−1) to a global time at which the memory access request is received. For example, if k is 4 and a global time at which the memory access request is received is 0, a time tag of the memory access request may be set to 3. The time tag is not changed unlike the global time.

According to another aspect, the receiver 202 may determine whether to generate a stall according to whether two or more memory access requests from the L/S units refer to the same memory area. For example, if there are two or more memory access requests to the same memory bank, the receiver 202 may generate a stall signal. The stall signal may stop the operations of the previous pipeline stages and maintain the global time of the global time controller 201.

The memory access preparing unit 203 may include a shared queue in which memory access requests are stored. For example, a memory access request with a time tag may be stored in the shared queue of the memory access preparing unit 203.

According to an aspect, a shared queue may be provided for each L/S unit that generates a memory access request. Also, the memory access preparing unit 203 may determine whether to generate a stall based on whether two or more memory access requests stored in shared queues refer to the same memory area. In this example, if there are two or more memory access requests to access the same memory bank, the memory access preparing unit 203 may output a stall signal to the processor 101 (see FIG. 1) and the global time controller 201. The stall signal stops the operations of the processor 101 and the previous pipeline stages, and the global time controller 201 may maintain a global time without changing it for the corresponding operation cycle.

According to an aspect, if two or more memory access requests stored in the shared queues refer to the same memory area, the memory access preparing unit 203 may process the individual memory access requests sequentially according to predetermined priorities. For example, the memory access preparing unit 203 may transfer memory access requests having higher priorities to the memory access unit 204 and store the remaining memory access requests in a shared queue. At the next cycle, the memory access preparing unit 203 may transfer the memory access requests to the memory access unit 204.

The memory access unit 204 which has received a memory access request accesses a memory (for example, 103 of FIG. 1) to store or load data in or from the memory. If the memory access unit 204 loads data from the memory, the loaded data is transferred to the output unit 205.

The output unit 205 may provide the loaded data to the L/S unit that has generated the memory access request. If the data is loaded, the output unit 205 may compare a current global time to a time tag corresponding to the data. If the current global time is equal to the time tag, the output unit 205 provides the loaded data to the L/S unit. As another example, if the global time is not equal to the time tag, the output unit 205 may store the loaded data without providing it to the L/S unit. In this case, the output unit 205 may maintain the loaded data therein until the global time increases to the same time as the time tag.

According to another aspect, the output unit 205 may include a plurality of ROBs. Each ROB may correspond to a L/S unit.

According to another aspect, the ROBs may store data having different time tags, respectively. For example, data loaded according to a memory access request having a time tag of 0 may be stored in a reorder buffer #0, and data loaded according to a memory access request having a time tag of 1 may be stored in a reorder buffer #1.

Figure 3:
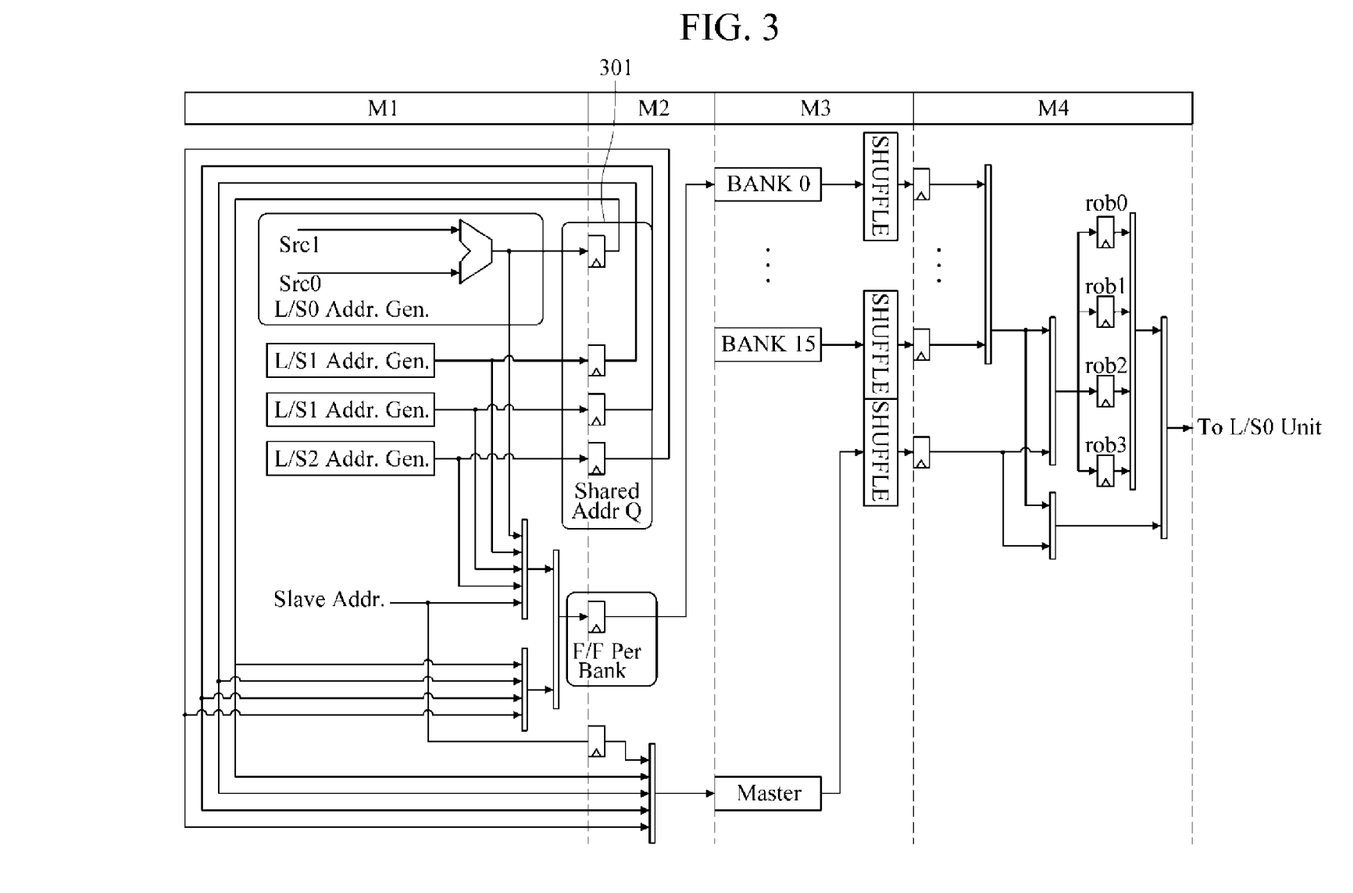
FIG. 3 is a circuit diagram illustrating an example of a memory controller.

FIG. 3 is a circuit that illustrates an example of a memory controller.

Referring to FIG. 3, four L/S units, one slave port, and four pipeline stages M1 through M4 are provided, and a load latency is assumed to be 4. Also, a memory includes 16 banks that are configured in an interleaved fashion.

It should be appreciated that the numbers of the L/S units, slave port, pipeline stages, and memory banks and the load latency are not limited to the above-mentioned numbers, and may be variously changed according to the conditions or architecture of a system in which the memory controller is installed, according to a data access pattern, and the like.

The M1 stage includes a plurality of multiplexers (MUXs) that are provided in correspondence to the respective banks, although FIG. 3 shows only bank0. Likewise, the M4 stage includes a plurality of ROBs and a plurality of MUXs that are provided in correspondence to the respective L/S units, although FIG. 3 shows only a L/S0 unit.

Referring to FIG. 3, the M1 stage may set a time tag when at least one memory access request is received. The time tag may be set using a predetermined global time that has a value that changes every operation cycle. Alternatively, the M1 stage may determine whether to generate a stall based on the number of memory access requests requiring access to the same memory area and adjust a global time according to the result of the determination.

As another example, the M2 stage may determine whether to generate a stall based on the number of memory access requests requiring access to the same memory area, and adjust a global time according to the result of the determination.

The M3 stage may access a memory bank in response to a memory access request to store or load data in or from the memory bank.

In response to data being loaded, the M4 stage may return or maintain the loaded data according to the result of comparison between the time tag and the global time.

According to an aspect, in an example in which there are two or more memory access requests requiring access to the same memory bank, a shared address queue 301 may temporarily store memory access addresses of memory access requests that cannot be first processed, and maintain the memory access requests therein until they can be processed according to their priorities. In other words, if there are two or more memory access requests requiring access to the same memory bank, the memory access requests may be sequentially processed according to their predetermined priorities.

In FIG. 3, a load latency is 4 and the number of pipeline stages is 4. In this example, a stall may be generated when there are two or more memory access requests from among L/S0, L/S1, L/S2, S/S3, and Slave Interface, requiring access to the same memory bank. For example, if there are two or more valid memory access requests requiring access to the same memory bank in the M1 stage or when two or more valid addresses referring to the same memory bank exist in the shared address queue 301, a stall may be generated.

In response to a stall being generated, memory access requests (hereinafter, referred to as L/S requests) existing in the M1 stage may remain in the M1 stage, and valid L/S requests existing in the remaining stages may be processed.

Data that is read from the corresponding memory banks in response to the valid L/S requests may be stored in ROBs and then returned to the corresponding L/S units in consideration of load latency. In order to put load latency into consideration, the L/S units may generate time tags (ROB IDs) and determine which ROB the data will be stored in. For example, the L/S units may use a global timer to generate time tags.

The global timer may be a 2-bit counter. In the example of FIG. 3, the global timer counts 0, 1, 2, 3 recursively in this order every rising clock edge, however, the global timer stops counting when a stall is generated. Here, the bit number of the global timer may vary depending on the number of pipeline stages and the number of entries of ROBs.

In response to a memory access address being transferred from the M1 stage to the M2 stage, each L/S unit may generate a time tag (ROB ID) and transfer the time tag to the M2 stage together with the memory access address.

In the example of FIG. 3, the time tag (ROB ID) value may be set to a value (+3) of the global timer. That is, when a valid L/S request from a L/S unit is transferred to the M2 stage, latency 1 of the entire latency 4 is consumed and latency 3 remains.

In the M4 stage, if a time tag (ROB ID) is 0, the read data may be stored in ROB0, if a time tag is 1, the read data may be stored in ROB1, if a time tag is 2, the read data may be stored in ROB2, and if a time tag is 3, the read data may be stored in ROB3. Also, in addition to storing the read data in ROB, if a value of the global timer is equal to a time tag (ROB ID) value when the read data exists in the M4 stage, the read data may be directly returned to the L/S unit.

A selection signal of a 4:1 MUX for selecting ROB in the M4 stage may use a value of the global timer. For example, if the value of the global timer is 0, data of the ROB0 may be selected, if the value of the global timer is 1, data of the ROB1 may be selected, if the value of the global timer is 2, data of the ROB2 may be selected, and if the value of the global timer is 3, data of the ROB3 may be selected.

FIGS. 4A through 4F illustrate example operations of a memory controller.

Figure 4A:
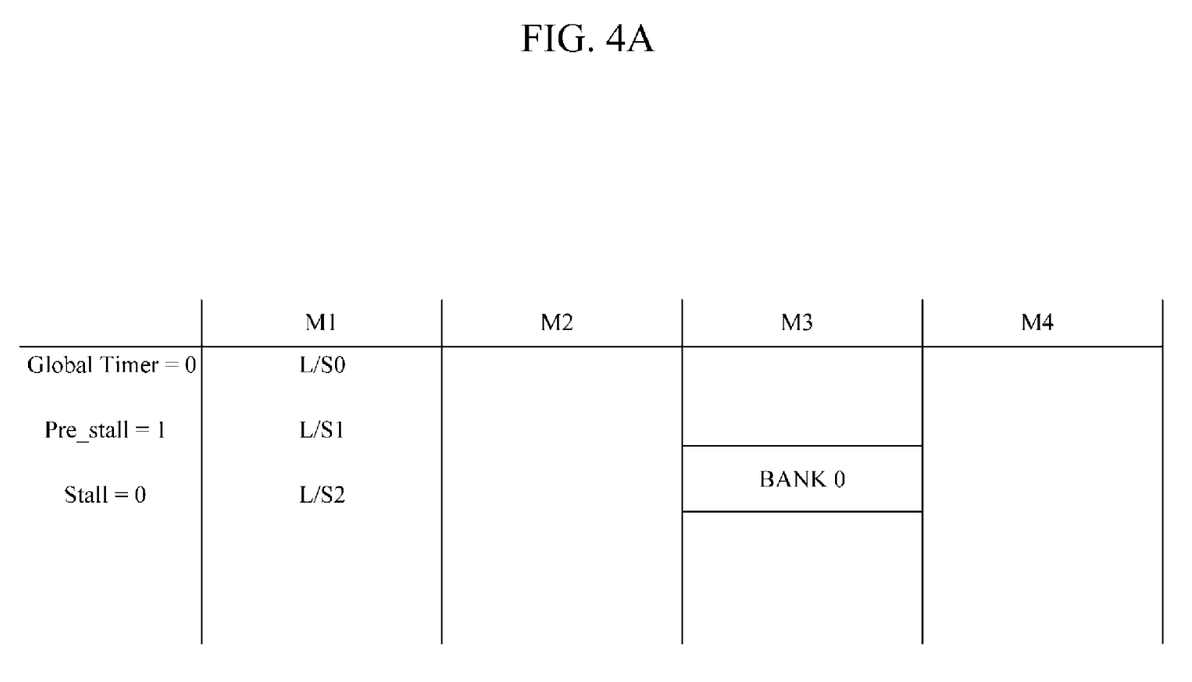
FIGS. 4A through 4F are diagrams illustrating examples of the operation of a memory controller.

Referring to FIG. 4A, in initial operation cycle 0, a global timer value is 0 and two or more L/S units try to access BANK0. Accordingly, Pre_Stall may be set to 1. Pre_Stall is a signal instructing "generate a stall in a next cycle".

Figure 4B:
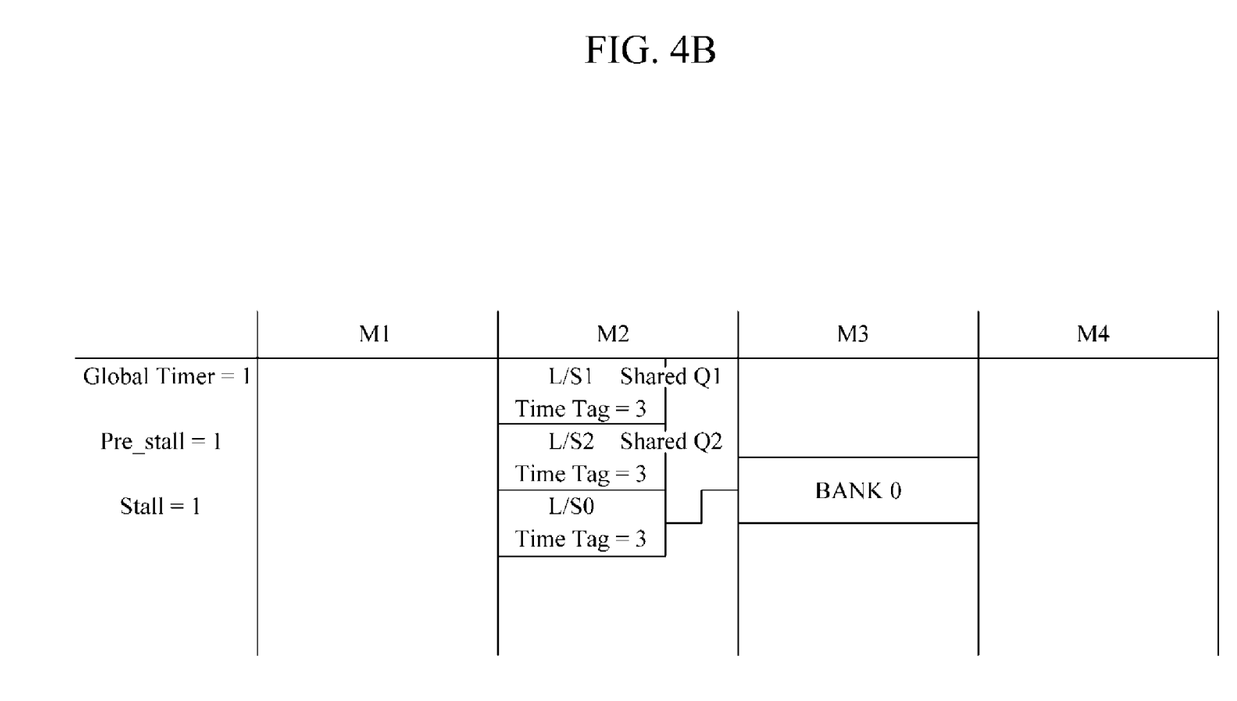

In operation cycle 1, referring to FIG. 4B, the global timer value is 1 and a request from L/S0 having high priority is selected to prepare to access BANK0, and requests of L/S1 and L/S2 are stored in respective shared queues (that is, in a shared Q1 and shared Q2). Also, Stall is set to 1 according to Pre_Stall that has been set to 1 in the previous cycle 0. In addition, because two valid L/S addresses exist in the shared queues, Pre_Stall is also set to 1 (in this example, it is assumed that higher priorities have been allocated in the order of Slave Interface→L/S0→L/S1→L/S2→L/S3). A time tag value is 3.

Figure 4C:
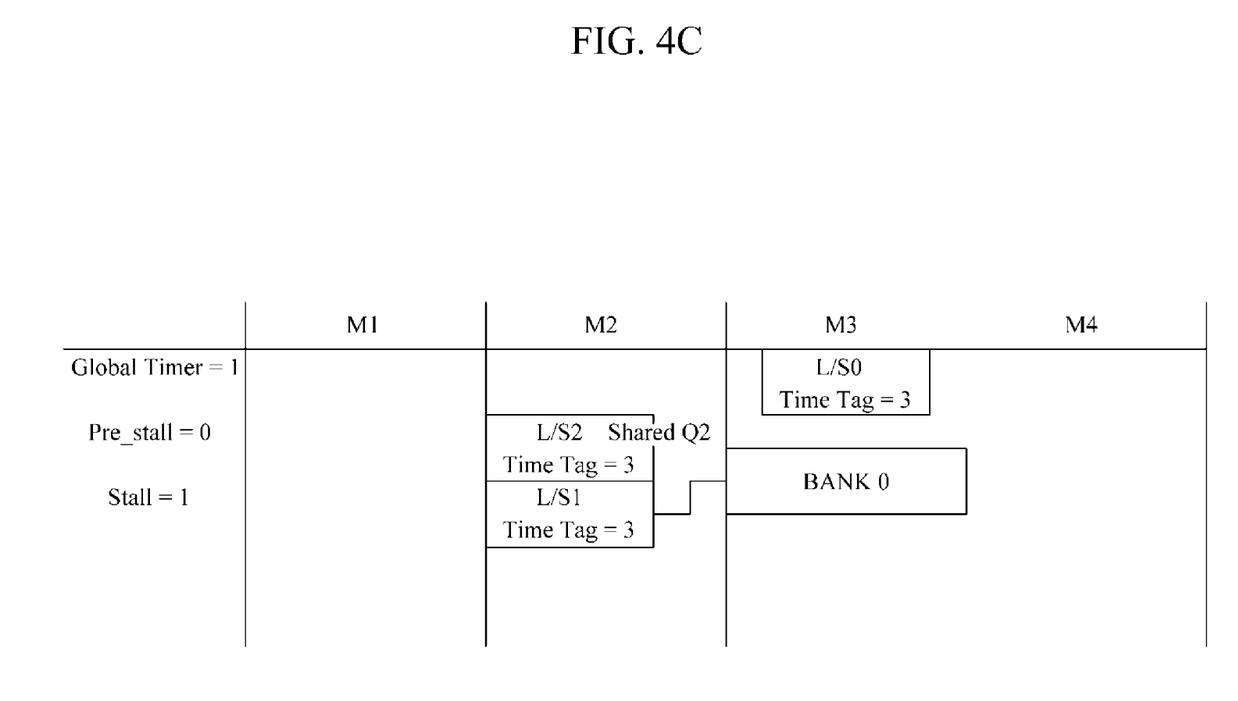

In operation cycle 2, referring to FIG. 4C, because Stall=1, the global timer value does not increase and is maintained at 1. The request of L/S0 is accessing BANK0, and the request of L/S1 having the next priority is preparing to access BANK0. Because Pre_Stall has been set to 1 in the previous cycle, Stall is still set to 1.

Figure 4D:
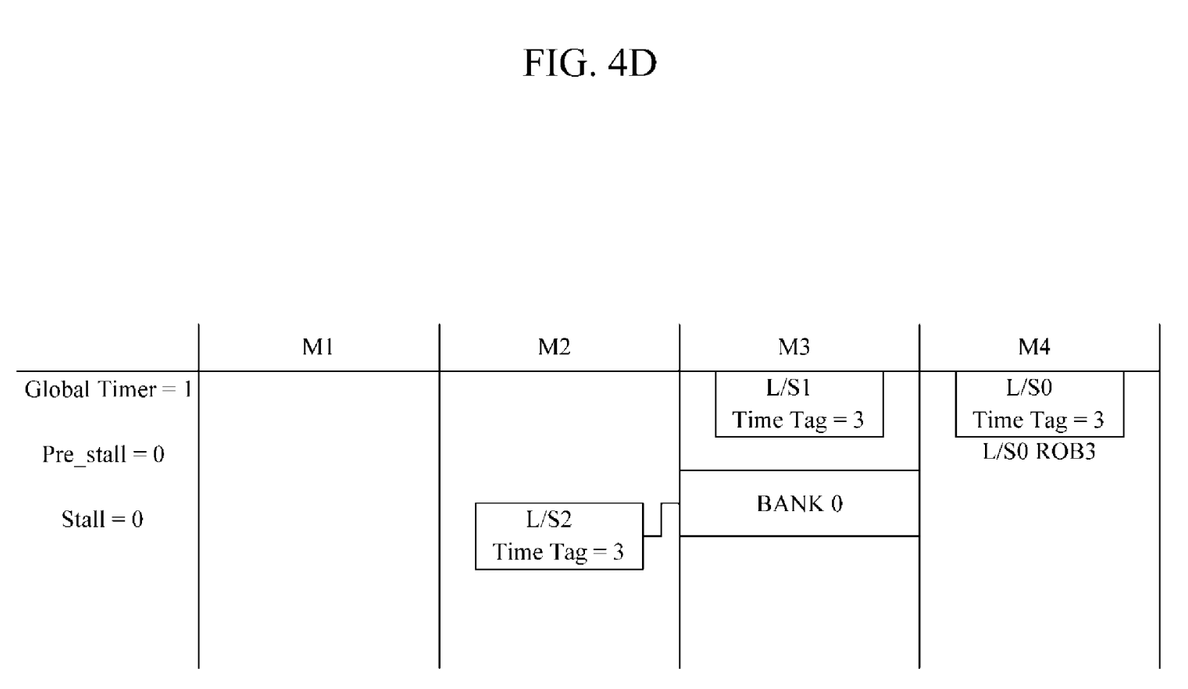

In operation cycle 3, referring to FIG. 4D, because the global time value does not increase by Stall, the global timer value is maintained at 1. Data read from BANK0 is stored in ROB3 of ROBs of L/S0 according to a time tag value. Because the global timer value is not "3", no data is yet returned to L/S0.

Figure 4E:
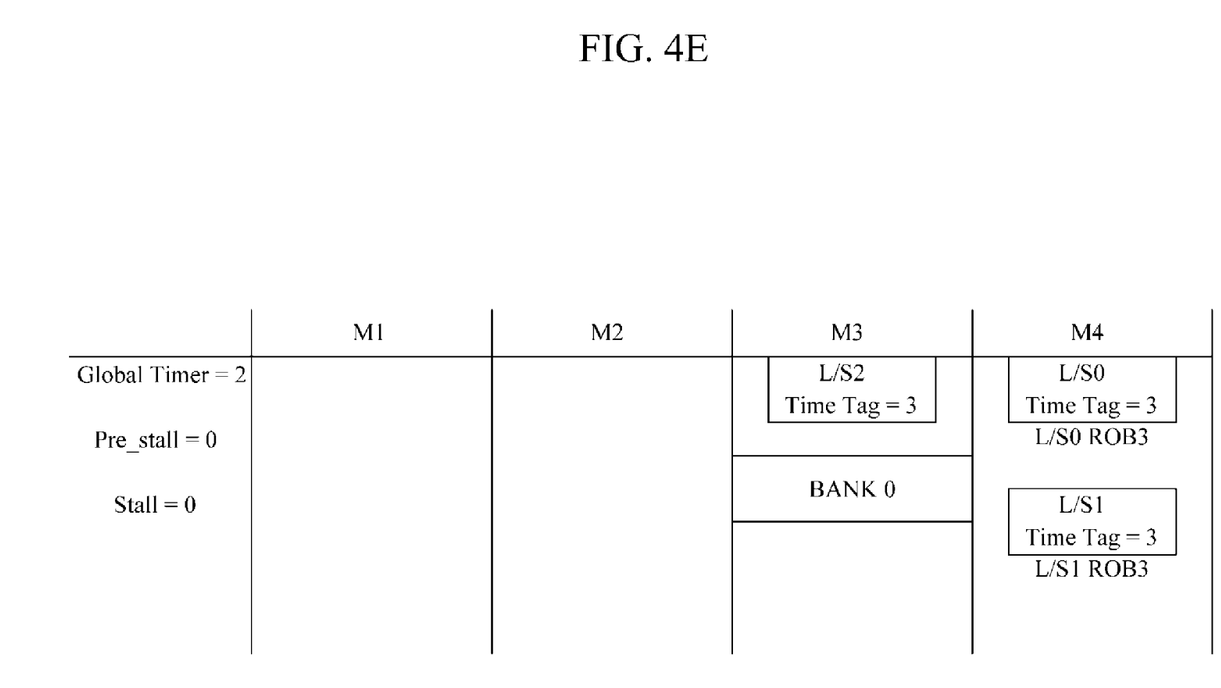

In operation cycle 4, referring to FIG. 4E, the global timer value increases to "2". Data read from BANK0 is stored in ROB3 of ROBs of L/S1 according to a time tag value. However, because the global timer value is still not "3", no data is yet returned to L/S0 and L/S1.

Figure 4F:
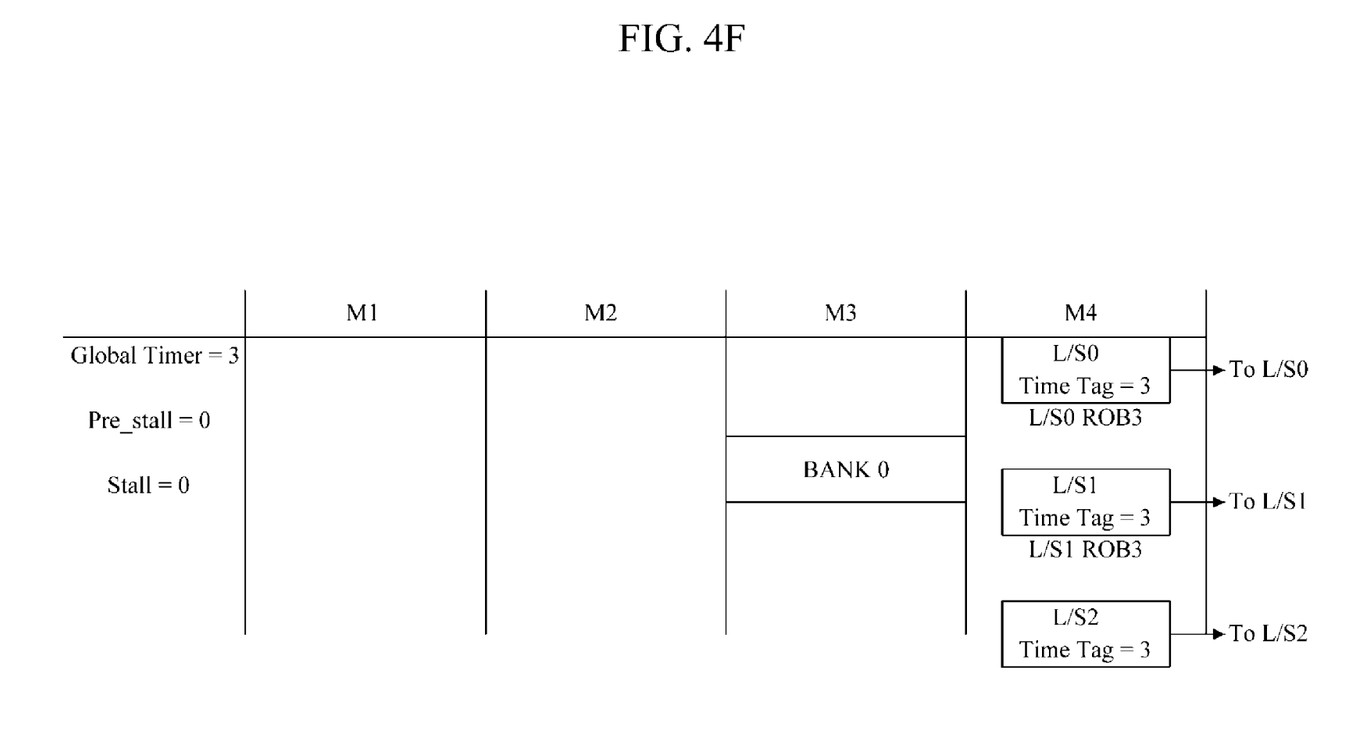

In operation cycle 5, referring to FIG. 4F, the global timer value increases to reach "3". Accordingly, data read from BANK0 is returned to L/S2 because the time tag value is equal to the global timer value. In addition, data stored in ROB3 of L/S0 and ROB3 of L/S1 is returned to L/S0 and L/S1, respectively.

As such, in view of a processor (for example, 101 of FIG. 1) that has issued a memory access request, because a Stall is generated twice during 6 cycles from cycle 0 to cycle 5, data of L/S units is returned in 4 cycles in consideration of load latency of 4.

Figure 5:
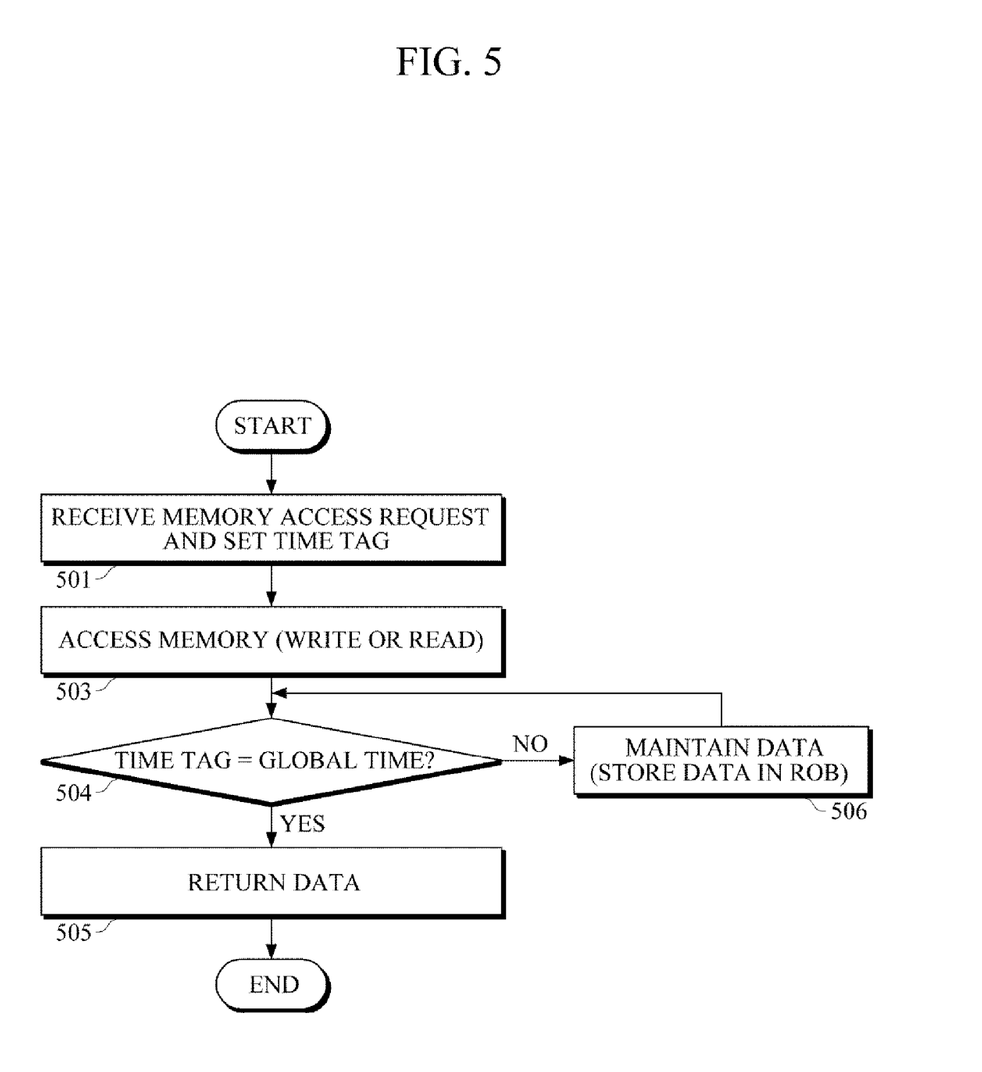
FIG. 5 is a flowchart illustrating an example of a memory control method.

FIG. 5 illustrates an example of a memory control method.

Referring to FIG. 5, at least one memory access request is received, and a time tag for the received memory access request is set (501). For example, the time tag may be used as identification information of a plurality of ROBs installed in an output unit (for example, 205 of FIG. 2). Also, the time tag may be set according to a global time. For example, if latency of a system is k, a time tag may be set to a sum of (k−1) and a global time at which a memory access request is received. The global time may be a value of a counter that increases recursively every operation cycle except for when Stall is generated. The global time may be given as an integer from 0 to (k−1) when the number of entries of ROBs is k.

After a time tag is set, a global time is adjusted based on whether a stall is generated (503-506). For example, if there are two or more memory access requests to the same memory bank, a stall may be generated. If a stall is generated, a global time is not changed even though an operation cycle increases. The multiple memory access requests may be processed sequentially according to their predetermined priorities.

While the global time keeps being adjusted according to whether a stall is generated, an access to the corresponding memory bank is made so that requested data is written in or read from the memory bank (503).

In response to the data being read, a time tag corresponding to the data is compared to a global time at which the data is read to reach the output unit (504). If the time tag is equal to the global time, the read data is returned (505). If the time tag is not equal to the global time, the read data is stored in a dedicated ROB according to the time tag (506).

According to various aspects, a simple stall generating logic is used to satisfy high frequency memory requests and also to reduce generation of a stall of a memory controller using the memory with interleaved fashion. Moreover, because a time tag is generated using a global time in a simple method, hardware resources and critical paths can be reduced.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A memory controller comprising:
a global time controller configured to control a global time based on whether a stall is generated;
a receiver configured to receive at least one memory access request, and to set a time tag of the memory access request using the global time;
a memory access unit configured to access a memory based on the memory access request to store or load data to or from the memory; and
an output unit configured to return the data at a time that is based on a comparison between the time tag and the global time.

2. The memory controller of claim 1, further comprising a memory access preparing unit comprising a shared queue for storing the memory access request.

3. The memory controller of claim 2, wherein the stall is generated if at least two memory access requests requesting access to the same memory area are present in the shared queue when the load latency is equal to the number of memory controller's pipeline stages.

4. The memory controller of claim 2, wherein the global time controller changes the global time each operation cycle, except in an operation cycle in which a stall is generated.

5. The memory controller of claim 2, wherein the shared queue is provided for each load/store unit that generates the memory access request.

6. The memory controller of claim 1, wherein the memory area is defined based on an interleaved bank.

7. The memory controller of claim 1, wherein the global time controller defines the global time using the number of entries of reorder buffers (ROBs) of a processing core including a load/store unit that generates the memory access request when the number of entries of reorder buffers (ROBs) is equal to the number of pipeline stages.

8. The memory controller of claim 7, wherein the number of the entries of the ROBs is an arbitrary integer k, and the global time controller changes the global time using integers between 0 and (k−1).

9. The memory controller of claim 7, wherein the number of the entries of the ROBs is an arbitrary integer k, and the receiver sets the time tag to a value resulting from adding (k−1) to a global time at which the memory access request is received.

10. The memory controller of claim 1, wherein the output unit comprises at least one reorder buffer (ROB) for storing loaded data and which is provided for each load/store unit that generates the memory access request.

11. The memory controller of claim 10, wherein, in response to data being loaded, the output unit stores the loaded data in the ROB according to the time tag of the memory access request, and
in response to the time tag being equal to the global time, the output unit returns the data stored in the ROB to a load/store unit.

12. A memory control method comprising:
- in response to at least one memory access request being received, setting a time tag of the memory access request using a predetermined global time that has a value that changes each operation cycle except for an operation cycle in which a stall is generated;
- determining whether to generate a stall, based on the number of memory access requests requesting access to the same memory area when the load latency is equal to the number of pipeline stages, and adjusting the global time based on whether the stall is generated;
- accessing a memory according to the memory access request to store or load data to or from the memory; and
- in response to the data being loaded, returning the data at a time based on a comparison between the time tag and the global time.

13. The memory control method of claim 12, wherein the global time is defined based on the number of entries of reorder buffers (ROBs) of a processing core including a load/store unit that generates the memory access request when the number of entries of reorder buffers (ROBs) is equal to the number of pipeline stages.

14. The memory control method of claim 12, wherein the determining of whether to generate the stall comprises generating a stall in response to the number of memory access requests requesting access to the same memory area being two or more.

15. The memory control method of claim 11, wherein the returning of the data comprises:
- storing the loaded data in at least one ROB provided for each load/store unit that generates the memory access request; and
- in response to the time tag being equal to the global time, returning the data stored in the ROB to a load/store unit.

* * * * *